United States Patent [19]
Hung et al.

[11] Patent Number: 5,475,772
[45] Date of Patent: Dec. 12, 1995

[54] SPATIAL FILTER FOR IMPROVING POLARIZATION EXTINCTION RATIO IN A PROTON EXCHANGE WAVE GUIDE DEVICE

[75] Inventors: Henry H. Hung, Paradise Valley; Ren-Young Liu, Mesa, both of Ariz.

[73] Assignee: Honeywell Inc., Minneapolis, Minn.

[21] Appl. No.: 252,704

[22] Filed: Jun. 2, 1994

[51] Int. Cl.[6] .................................................. G02B 6/10
[52] U.S. Cl. ............................................. 385/11; 385/130
[58] Field of Search ................................. 385/11, 6, 14, 385/31, 49, 129, 130; 356/345

[56] References Cited

U.S. PATENT DOCUMENTS

| | | | |
|---|---|---|---|
| 4,588,296 | 5/1986 | Cahill et al. | 356/350 |
| 4,875,775 | 10/1989 | Michal et al. | 356/350 |
| 4,910,738 | 3/1990 | Fujita et al. | 372/18 |
| 4,915,503 | 4/1990 | Pavlath | 356/350 |
| 4,938,594 | 7/1990 | Pavlath | 356/345 |
| 4,991,937 | 2/1991 | Urino | 350/401 |
| 5,026,161 | 6/1991 | Werner | 356/350 |
| 5,093,884 | 3/1992 | Gidon et al. | 385/14 |
| 5,133,029 | 7/1992 | Baran et al. | 385/11 |
| 5,137,360 | 8/1992 | Ferrar | 356/350 |
| 5,202,938 | 4/1993 | Man et al. | 385/11 |
| 5,205,938 | 4/1993 | Fiumano et al. | 210/653 |
| 5,223,911 | 6/1993 | Suchoski, Jr. et al. | 356/350 |
| 5,245,471 | 9/1993 | Iwatsuka et al. | 359/494 |

*Primary Examiner*—John D. Lee
*Assistant Examiner*—Phan T. H. Palmer
*Attorney, Agent, or Firm*—John G. Shudy, Jr.

[57] ABSTRACT

A proton exchange polarizer with a spatial filter positioned to reduce cross coupling of unguided radiation. A photoconductor substrate is fabricated from $LiNbO_3$ or $LiTaO_3$. The substrate has a spatial filter located at a primary reflection point on a bottom of the substrate so as to block unguided TM mode light from reaching the output of the substrate. The spatial filter is fabricated by physical or chemical methods such as saw cutting, diamond machining, etching, micro-machining, laser-machining and/or damaging the surface of the substrate. The unguided TM mode light is attenuated by blockage or interruption of the transmissive region.

15 Claims, 8 Drawing Sheets

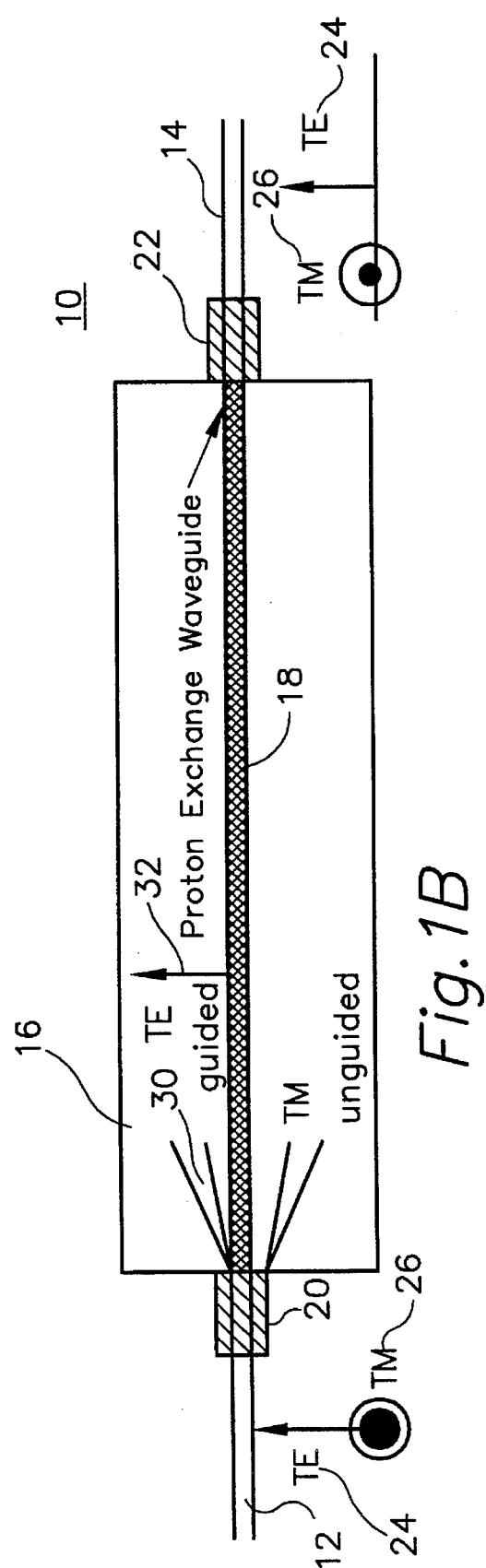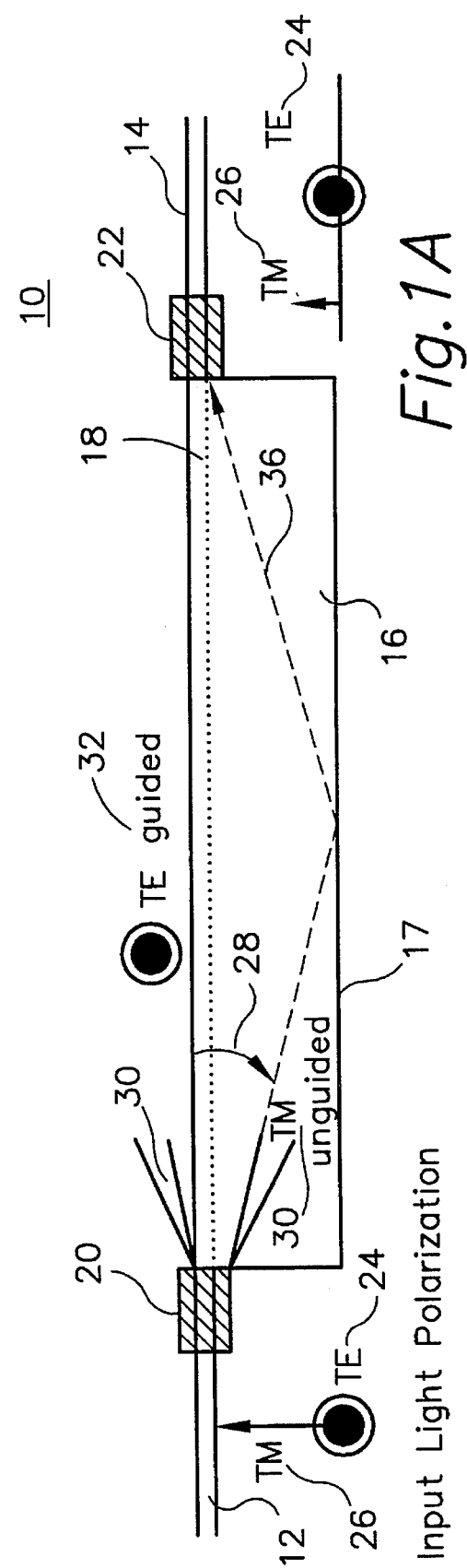

Primary Reflection

Secondary Reflection

SPATIAL FILTER FOR IMPROVING POLARIZATION EXTINCTION RATIO IN A PROTON EXCHANGE WAVE GUIDE DEVICE

This invention relates to a proton exchange polarizer and more particularly to a proton exchange polarizer employing a spatial filter to block reflected light.

BACKGROUND OF THE INVENTION

Optical wave guide devices fabricated by the Proton Exchange (PE) method provide some unique qualities. The process of proton exchange increases the refractive index only in extraordinary axis and thus will only guide one polarization state. The other polarization state is unguided and is eventually eliminated. This quality of Proton Exchange devices makes them naturally very high performance polarizers (60 dB or more). In addition, this quality makes them very attractive for use in Multiple Function Chips (MFCs) used in construction of fiber optic gyros (FOGs).

SUMMARY OF THE INVENTION

The invention provides a proton exchange polarizer where cross-coupling of unwanted modes of light is reduced with an integrated spatial filter. An optically transmissive substrate such as a substrate created from $LiNbO_3$ or $LiTaO_3$ has a bottom surface which reflects unguided TM mode light. The light originates from an input fiber. The input fiber is connected to the substrate at one end and an output fiber is connected to receive guided TE mode light at the opposite end. The bottom of the substrate couples the unguided TM mode light to the output fiber. This coupling is undesirable in various polarizer applications such as those used in fiber-optic gyros. The extinction ratio of the substrate can be improved by the incorporation of a spatial filter. The spatial filter is positioned at the primary reflection position of the light with respect to the bottom of the polarizer. To improve extinction further, the spatial filter can also be located at secondary reflection points in another alternate embodiment. The spatial filter is positioned within the substrate or at the bottom of the substrate, depending on whether the barrier was created by physical or chemical methods such as saw cutting, etching, diamond machining, micro-machining, or laser-machining. The spatial filter acts to block the propagation of the unguided TM light.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 1A schematically shows a proton exchange polarizer side view illustrating a crosstalk mechanism.

FIG. 1B schematically shows a proton exchange polarizer top view illustrating the crosstalk mechanism.

DETAILED DESCRIPTION OF THE PREFERRED EMBODIMENT

Figure 2:
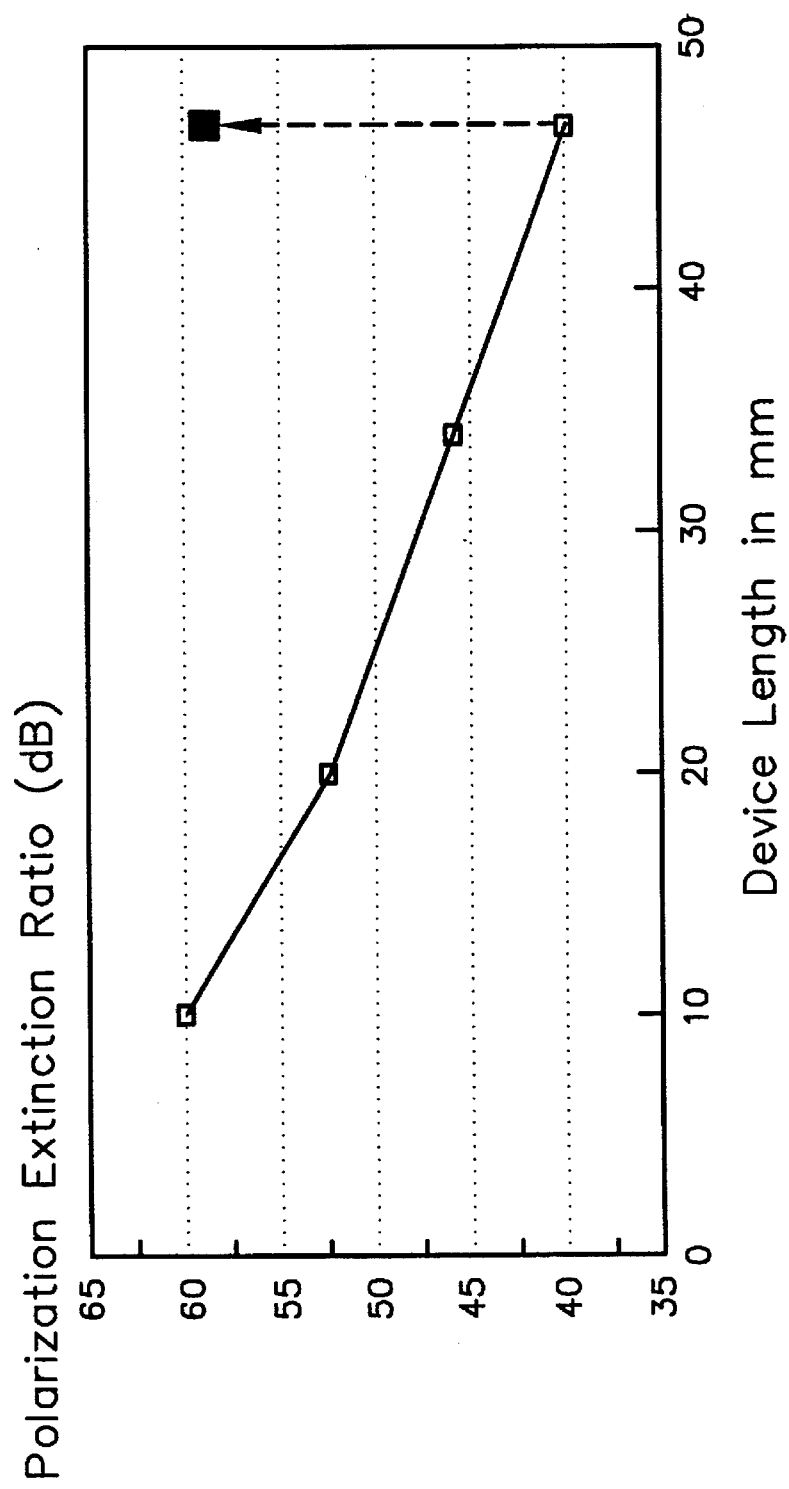
FIG. 2 shows a graph of the improvement achieved by using the method of the invention in polarization extinction ratio.

Now refer to FIG. 1A which shows a schematic diagram of a proton exchange polarizer with crosstalk. A proton exchange polarizer 10 comprises a $LiNbO_3$ or $LiTaO_3$ material. An optically transmissive substrate 16. The proton exchange polarizer 10 further comprises glass ferrule 20 as an input coupling for an optical fiber 12 and glass ferrule 22 coupled to an output fiber 14. The optical fiber 12 receives light comprised of both a TE mode 24 and a TM mode 26. The TE mode 24 comprises the electrical component of the optical wave and the TM mode 26 comprises the magnetic component of the optical wave. TE mode light 32 is substantially guided by proton exchange wave guide 18 through the optically transmissive substrate 16. When light exits the fiber 12 the TM mode 26 becomes unguided TM mode 30. The TE mode 24 becomes guided TE mode light 32 by proton exchange wave guide 18.

Unguided TM mode light 30 propagates through the optically transmissive substrate 16. A portion of the unguided TM mode light from the polarizer escapes. An angle of reflection 28 may be determined by the dimensions of the particular embodiment, specifically the distance between the glass ferrule 20 and glass ferrule 22.

The TM mode unguided light is reflected as indicated by broken line 36 from a bottom 17 of the substrate 16 and exits the substrate through fiber 14. The reflected unguided TM mode light 36 is unwanted in various applications such as fiber-optic gyros.

During the development of proton exchange devices it was discovered that some devices do not have very high extinction ratios (more than 60 dB) as expected. It was also found that the polarizer extinction ratio decreased with device length. After studying different devices, it was concluded that the crosstalk mechanism was TM light 30 that was unguided by the wave guide 18 and reflected from the bottom 17 of the wafer 16. The reflected TM light 36 was then collected by the output fiber 14. It was believed that longer polarizer length results in a smaller angle of reflection which increases this pickup. Several polarizers of different lengths were measured to confirm this theory.

Now referring to FIG. 2, FIG. 2 shows a plot of the improvement of extinction ratio for the proton exchange polarizer of the invention. In one example, the extinction ratio was improved from 40 dB to 57 dB.

Figure 3:
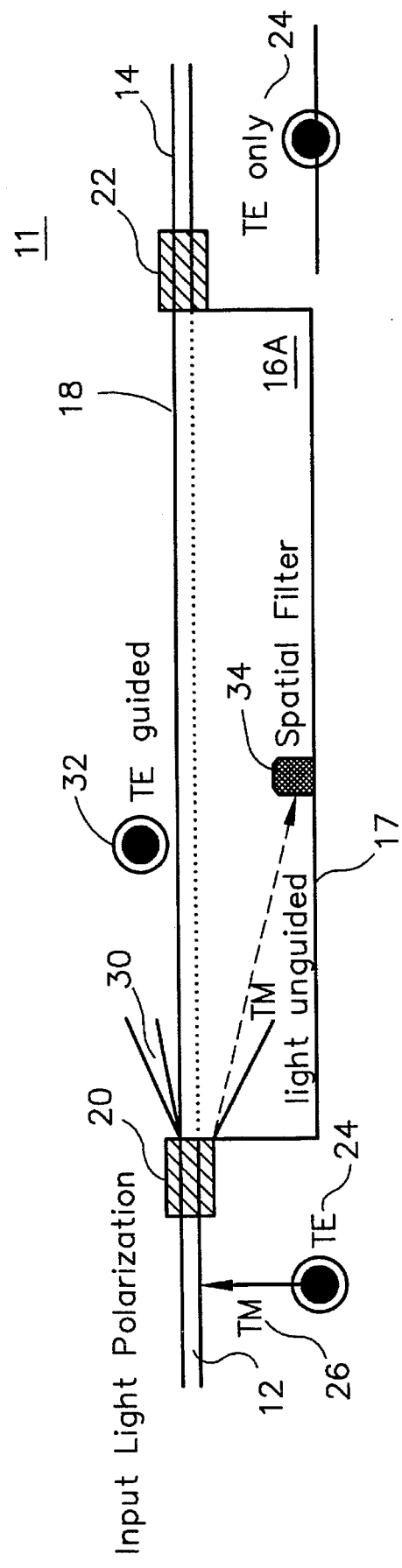
FIG. 3 schematically shows a proton exchange polarization crosscoupling removal method and apparatus showing the integrated spatial filter of the invention.

Referring now to FIG. 3, FIG. 3 shows the proton exchange polarizer 11 with an integrated spatial filter 34 located in the substrate 16a. The substrate 16a, as in FIG. 1, couples a fiber 12 with ferrule 20 to fiber 14 to ferrule 22. The substrate 16a incorporates a proton exchange wave guide 18. The TM mode unguided light 30 propagates through the light conducting substrate 16a as in FIG. 1 but is blocked by spatial filter 34 incorporated into the substrate 16a. The spatial filter 34 prevents reflected light from coupling back into the output fiber 14 by blocking the propagation of the light wave. The barrier, or the spatial filter 34, may be advantageously made by a number of processes including physically depositing the spatial filter 34 into the substrate 16a. The substrate may be saw-cut to create a void in the substrate 16a impeding the propagation of the unguided TM mode light 30. The bottom may be diamond machined, etched, micro-machined or laser-machined. Alternatively, the surface may simply be scratched or similarly damaged to provide spatial filters in the propagation path of the TM mode unguided light 30.

The reflected TM mode 30 is thus substantially removed by creating a spatial filter 34 in the bottom 17 side of the substrate 16a. With the spatial filter 34 or barrier incorporated into the substrate 16a, any reflected TM light 30 will be substantially blocked. However, there are multiple paths at which reflections may occur. In order to achieve high performance, both primary and secondary reflections must be substantially removed. Experimentally, it was found that three equally spaced spatial filters are required to satisfactorily remove the primary and secondary reflections.

Figure 4A:
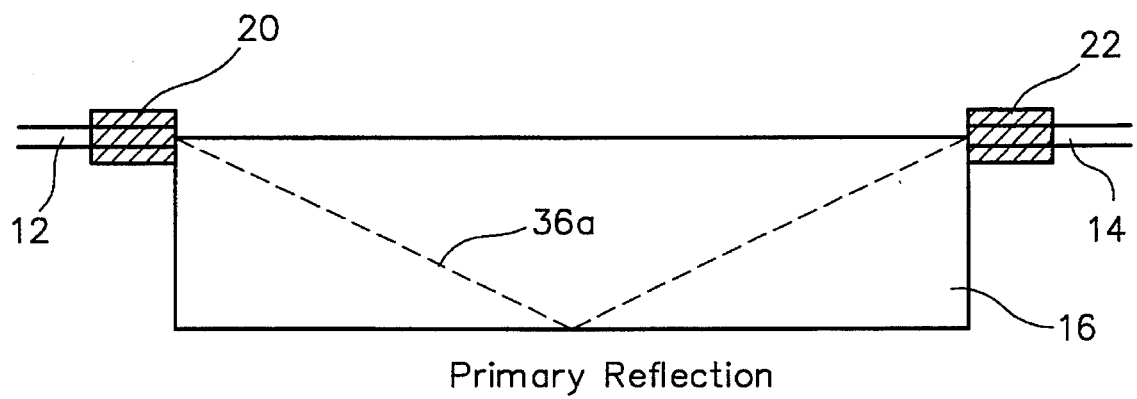
FIG. 4A schematically shows a primary reflection of the unguided TM mode.
Figure 4B:
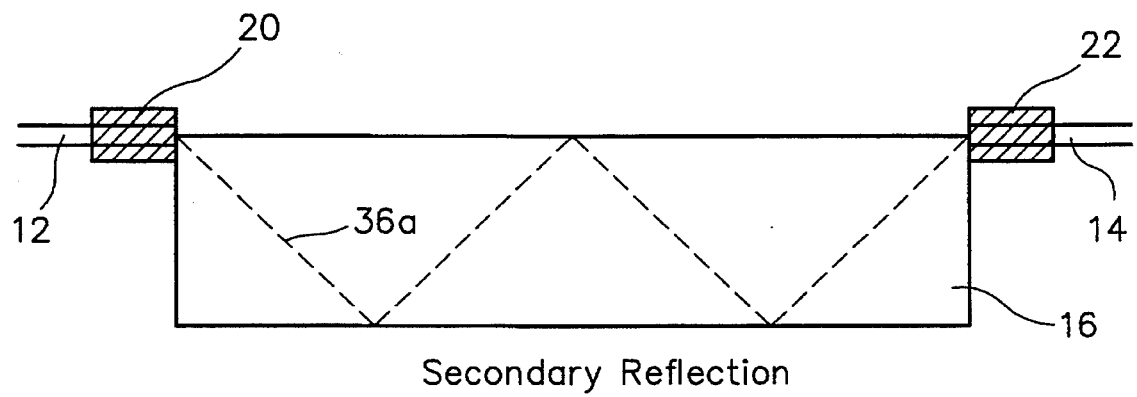
FIG. 4B schematically shows the secondary reflection of the unguided TM mode.

Now referring to FIG. 4 which shows the primary and secondary reflections of the unguided TM mode light. Unguided TM mode light 36a is primarily reflected from fiber-optic cable 12 to fiber-optic cable 14 through optically transmissive substrate 16. The secondary reflection of unguided TM mode light 36b is transmitted from fiber 12 to fiber 14 through substrate 16 after multiple reflections from the top and bottom of the substrate. Those skilled in the art having the benefit of this disclosure will recognize that for the primary reflection to be attenuated as well as the secondary reflection, the spatial filters must be located at primary and secondary reflection positions.

Figure 5B:
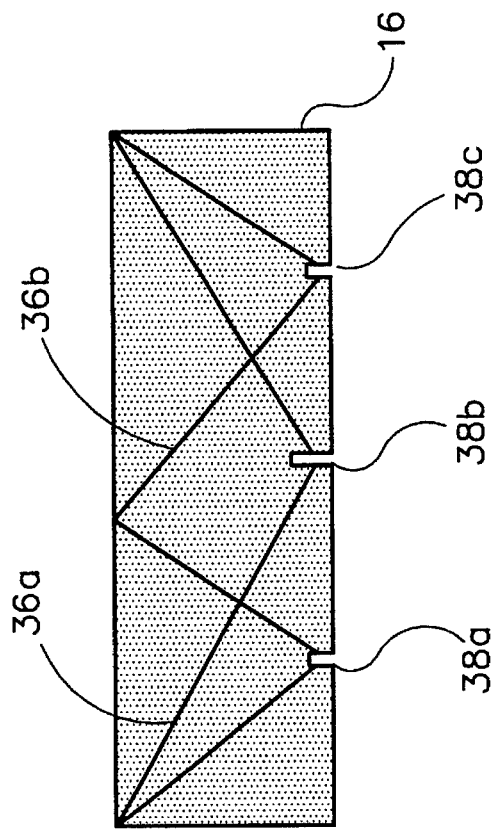
FIG. 5B shows a side view of a spatial filter created by a dicing saw.
Figure 5A:
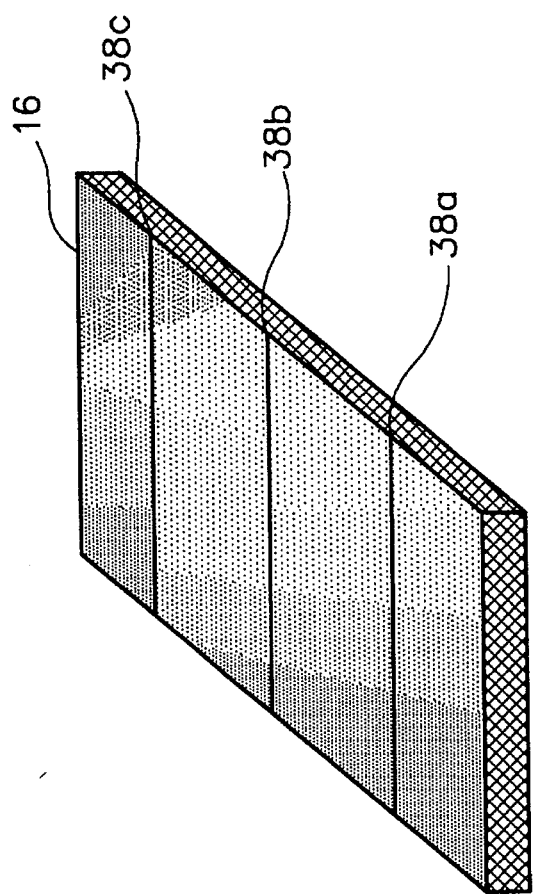
FIG. 5A shows a spatial filter created by cutting a slot in the bottom of a substrate with a dicing saw.

Now refer to FIG. 5 which shows the apparatus of the invention comprising a spatial filter created by a dicing saw. FIG. 5 shows an isometric view of the substrate 16 with three slots 38a, 38b and 38c. Slots 38a and 38c are used to attenuate the secondary reflections and 38b is intended to remove the primary reflection. The bottom of the substrate 16 is shown with cuts made across the entire length of the substrate 16. The side view shows the primary reflection path 36a and secondary reflection path 36b with the slots 38a, 38b, and 38c cut into the bottom of the substrate 16 attenuating the primary and secondary reflections.

Figure 6B:
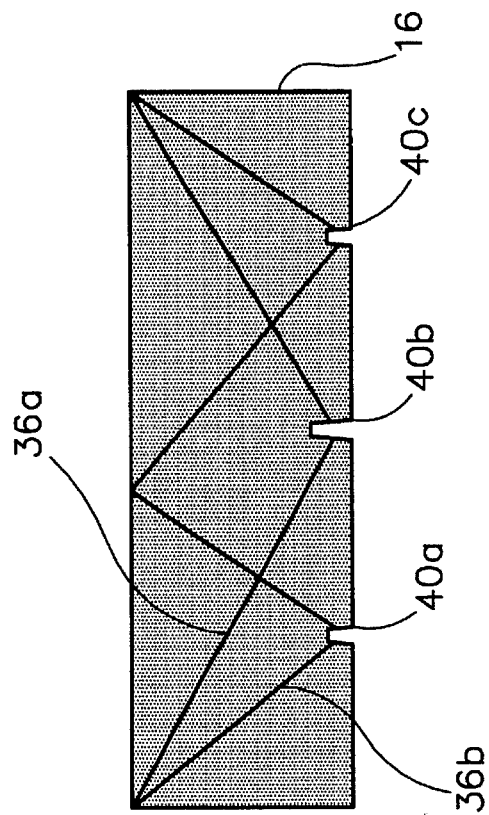
FIG. 6B shows a spatial filter created by diamond grinding or micro-machining in a side view.
Figure 6A:
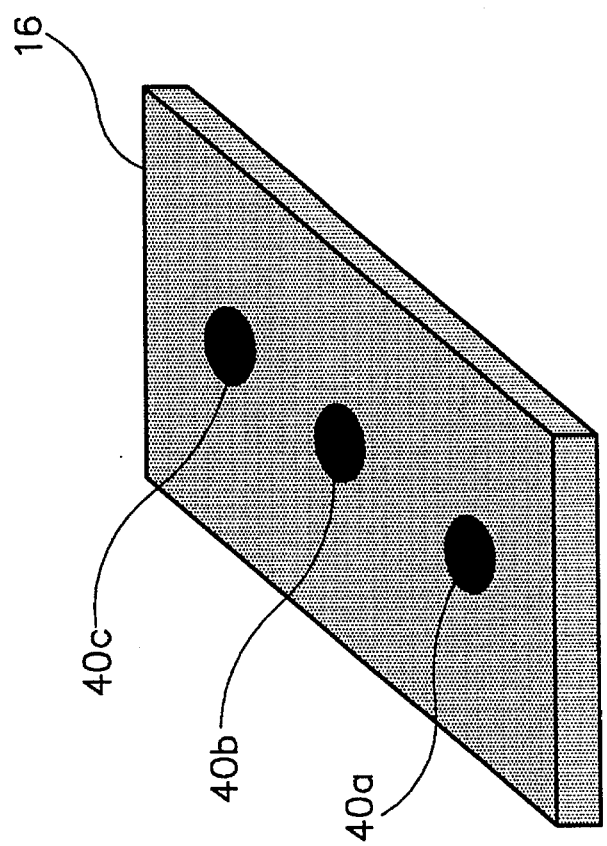
FIG. 6A shows an isometric view of a spatial filter created by micro-machining or diamond grinding holes in the bottom of a substrate.

FIG. 6 shows an alternative approach in accordance with the present invention using a diamond saw or other machining methods to cut generally circular holes in the substrate 16. Holes 40a, 40b, and 40c are positioned as the primary and secondary reflections such as is done with reference to FIG. 5 with the dicing-saw cuts. The holes 40a and 40c attenuate the secondary reflections 36b. The hole 40b attenuates the primary reflections 36a.

Several different approaches to implement the spatial filters have been disclosed. The dicing saw cuts slots in the back of device to form the spatial filters. This method increased the polarization extinction ratio by more than 17 dB when used on a long device of 1.9" in length.

Figure 7B:
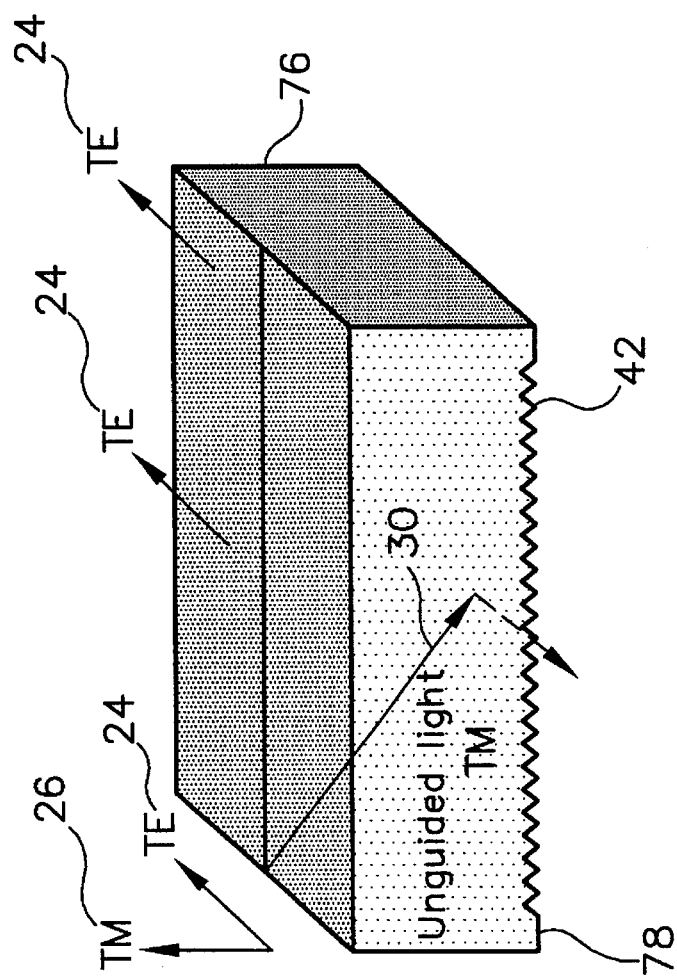
FIG. 7B shows a isometric view of a substrate having micro-machined or etched grooves.
Figure 7A:
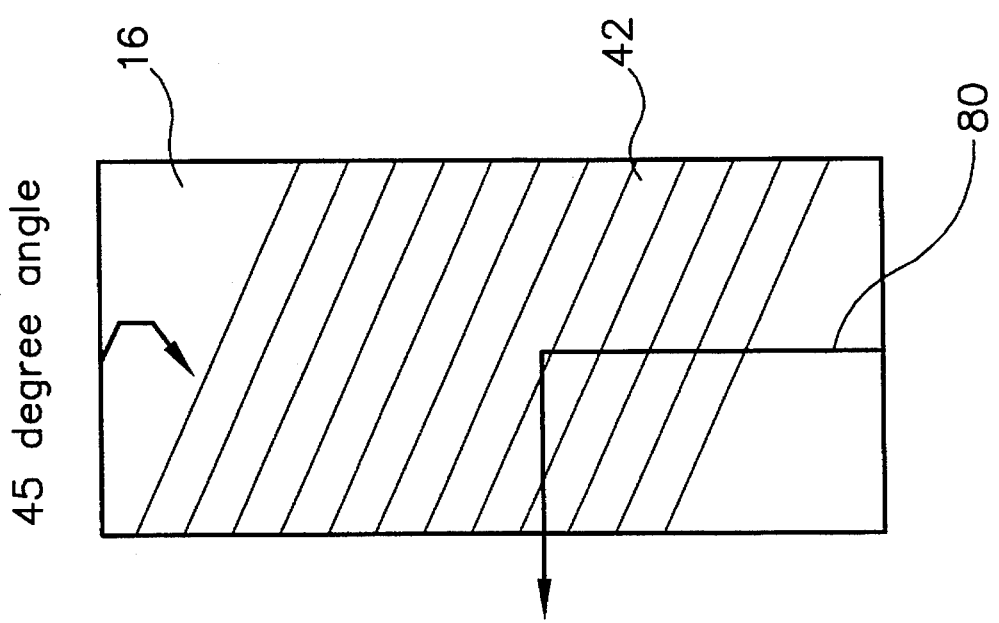
FIG. 7A shows a schematic of a bottom view of a substrate having grooves.

Now refer to FIG. 7a. FIG. 7a shows micro-etched grooves 42 in a substrate 76. These micro-etched groves are formed on a back side 78 of the substrate 76 substantially at about a 45° angle as referenced to an incoming beam of light. In this way, reflected light will be rejected at an angle of about 90° off the incident beam as indicated by arrow 80.

Figure 8:
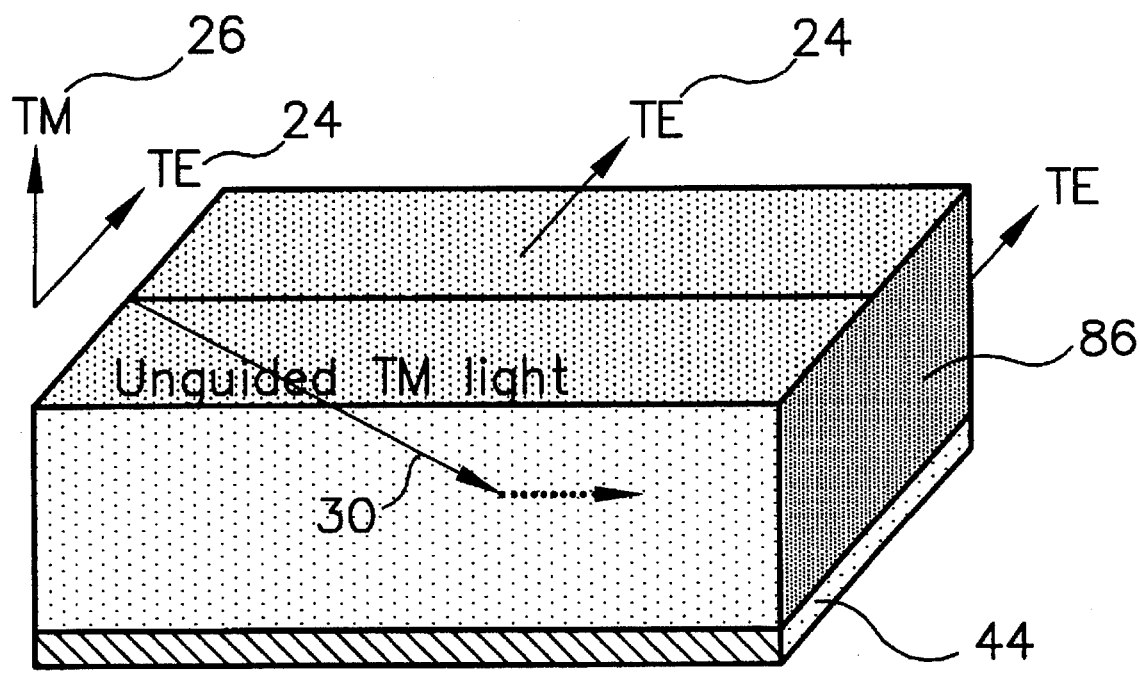
FIG. 8 shows an anti-reflective coating on the bottom of a substrate used to absorb unguided TM or light in the anti-reflective layer.

FIG. 8 shows an alternate embodiment of the present invention using an antireflection and absorbing layer 44 at the bottom of a substrate 86 so that there are no reflections from the bottom of substrate 86.

Experimental results have shown that with a slotted spatial filter in place, reflected and coupled TM light was reduced from 0.01% to less than 0.0005%. At the same time, the polarizer extinction ratio for polarizers including a spatial filter increased by more than 17 dB. This method greatly improves the performance of polarizers with minimal cost and complexity.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A proton exchange polarizer comprising:

an optically transmissive substrate, having a first surface, and a second surface approximately parallel to the first surface;

a proton exchange waveguide formed on the first surface of said optically transmissive substrate, having an extraordinary axis with an increased refractive index for guiding only one polarization state and having an input coupling on a first end and an output coupling on a second end; and an antireflection coating formed on the second surface of said optically transmissive substrate; and wherein:

light entering the input coupling has a TE mode and a TM mode;

light having the TE mode is substantially guided by said proton exchange waveguide;

light having the TM mode is substantially unguided; and a portion of the light having the TM mode propagates through said optically transmissive substrate, and almost any of the portion of the light having the TM mode that impinges the second surface of said optically transmissive substrate is unreflected because of the antireflection coating.

2. The proton exchange polarizer of claim 1 wherein the proton exchange polarizer comprises an LiNbO$_3$ material.

3. The proton exchange polarizer of claim 1 wherein the proton exchange polarizer comprises an LiTaO$_3$ material.

4. A proton exchange polarizer comprising:

an optically transmissive substrate, having a first surface, and a second surface approximately parallel to the first surface;

a proton exchange waveguide formed on the first surface of said optically transmissive substrate, having an extraordinary axis with an increased refractive index for guiding only one polarization state and having an input coupling on a first end and an output coupling on a second end; and an array of micro grooves, formed on the second surface, the array of micro grooves having a direction of approximately 45 degrees relative to a direction from the first end to the second end of said proton exchange waveguide; and wherein:

light entering the input coupling has a TE mode and a TM mode;

light having the TE mode is substantially guided by said proton exchange waveguide;

light having the TM mode is substantially unguided; and a portion of the light having the TM mode propagates through said optically transmissive substrate, and almost any of the portion of the light having the TM mode that impinges the array of micro grooves on the second surface of said optically transmissive substrate, is deflected approximately 90 degrees relative to the direction of the any of the portion of the light having the TM mode that impinges the second surface of said optically transmissive substrate.

5. The proton exchange polarizer of claim 4 wherein the proton exchange polarizer comprises an LiNbO$_3$ material.

6. The proton exchange polarizer of claim 4 wherein the proton exchange polarizer comprises an LiTaO$_3$ material.

7. A proton exchange polarizer comprising:

an optically transmissive substrate, having a first surface, a second surface approximately parallel to the first surface, and having first and second ends;

a proton exchange waveguide, formed on the first surface of said optically transmissive substrate, having an extraordinary axis with an increased refractive index for guiding only one polarization state and having an input coupling on a first end and an output coupling on a second end; and a plurality of deformations, formed on the second surface, each of the deformation being situated approximately equidistant from another deformation of said plurality of deformations; and wherein:

light entering the input coupling has a TE mode and a TM mode;

light having the TE mode is substantially guided by said proton exchange waveguide;

light having the TM mode is substantially unguided; and a portion of the light having the TM mode propagates through said optically transmissive substrate, and almost any of the portion of the light having the TM mode that impinges any of said plurality of deformations on the second surface of said optically transmissive substrate, is attenuated.

8. The proton exchange polarizer of claim 7 wherein:

said plurality of deformations is a plurality of slots;

each slot of said plurality if slots is approximately equidistant from another slot of said plurality of slots;

each slot of said plurality of slots is has a longitudinal direction approximately perpendicular to the extraordinary axis of said proton exchange polarizer.

9. The proton exchange polarizer of claim 8 wherein:

said plurality of slots is first, second and third slots;

the second slot is approximately equidistant from the first and second ends of said optically transmissive substrate;

the first slot is approximately equidistant from the second slot and the first end of said optically transmissive substrate; and the third slot is approximately equidistant from the second slot and the second end of said optically transmissive substrate.

10. The proton exchange polarizer of claim 9 wherein the proton exchange polarizer comprises an LiNbO$_3$ material.

11. The proton exchange polarizer of claim 9 wherein the proton exchange polarizer comprises an LiTaO$_3$ material.

12. The proton exchange polarizer of claim 7 wherein:

said plurality of deformations is a plurality of holes;

each hole of said plurality if holes is approximately equidistant from another hole of said plurality of holes;

said plurality of holes is aligned as a row in a direction approximately parallel to the extraordinary axis of said proton exchange polarizer.

13. The proton exchange polarizer of claim 12 wherein:

said plurality of holes is first, second and third holes;

the second hole is approximately equidistant from the first and second ends of said optically transmissive substrate;

the first hole is approximately equidistant from the second hole and the first end of said optically transmissive substrate;

the third hole is approximately equidistant from the second hole and the second end of said optically transmissive substrate; and the first, second and third holes are aligned so as to attenuate primary and secondary reflections of light having the TM mode originating from the input coupling and having paths that would lead to the output coupling but for attenuation by the first, second or third hole.

14. The proton exchange polarizer of claim 13 wherein the proton exchange polarizer comprises an LiNbO$_3$ material.

15. The proton exchange polarizer of claim 13 wherein the proton exchange polarizer comprises an LiTaO$_3$ material.

* * * * *